May 3, 1960 M. J. DI TORO 2,935,604

LONG RANGE COMMUNICATION SYSTEM

Filed Dec. 1, 1951 4 Sheets-Sheet 1

INVENTOR
MICHAEL J. DiTORO
BY Percy P. Lantzy
ATTORNEY

May 3, 1960 M. J. DI TORO 2,935,604

LONG RANGE COMMUNICATION SYSTEM

Filed Dec. 1, 1951 4 Sheets-Sheet 2

INVENTOR
MICHAEL J. DiTORO
BY
ATTORNEY

INVENTOR
MICHAEL J. DiTORO
BY
ATTORNEY

May 3, 1960 M. J. DI TORO 2,935,604

LONG RANGE COMMUNICATION SYSTEM

Filed Dec. 1, 1951 4 Sheets-Sheet 4

INVENTOR
MICHAEL J. DiTORO
BY Percy P. Lantzy
ATTORNEY 2,935,604

LONG RANGE COMMUNICATION SYSTEM

Michael J. Di Toro, Bloomfield, N.J., assignor, by mesne assignments, to the United States of America as represented by the Secretary of the Air Force Application December 1, 1951, Serial No. 259,412

13 Claims. (Cl. 250—6)

This invention relates to communication systems and more particularly to long range communication systems using multihop transmissions via ionisphere reflection and scattering.

The reliability of present long range communication systems is severely limited due to the necessity of communicating at high frequencies via the ionisphere. Reliable communication through the earth-ionisphere duct is difficult because of the time variable multipath reception existing at the receiver. Also, where a form of pulse communication is employed, the receiver sees a train of distinct pulses for each pulse transmitted, spaced apart proportional to the difference in multipath distances, which renders reception unreliable.

Another difficulty a long range communication system must overcome, at least substantially, is the introduction of noise during transmission and reception, both local receiver noise and noise due to the ionisphere of the thermal agitation type and the impulsive type.

One of the objects of this invention, therefore, is to provide a long range communication system which substantially overcomes the aforementioned difficulties.

Another object of this invention is to provide a long range communication system which overcomes substantially the interference or noise introduced by communication via the ionisphere.

A further object of this invention is to provide a long range communication system which is insensitive to wave shape distortion or fading caused by communication via the ionisphere.

Briefly, in this invention the input pulse modulated signal, modulated according to pulse amplitude or pulse code modulation principles, is applied to a transmitter by way of two circuits, one including a delay line and the other by-passing the delay line. The signal pulse and its delayed twin are then transmitted. At the receiver the pulse couplet is received and fed to a delay line. The output from the delay line and a received undelayed pulse train are combined or multiplied and the resultant output voltage is then integrated. A pulse generator reproduces an original pulse when the integrated voltage exceeds the average noise level of the transmission medium. Thus, in effect, the original pulse samples the transmission medium, and the receiver substantially eliminates all interference and clearly reproduces the original pulse signal from the information derived from the sampling pulse.

The above-mentioned and other features and objects of this invention and the manner of attaining them will become more apparent by reference to the following description taken in conjunction with the accompanying drawings, wherein.

Figure 1:
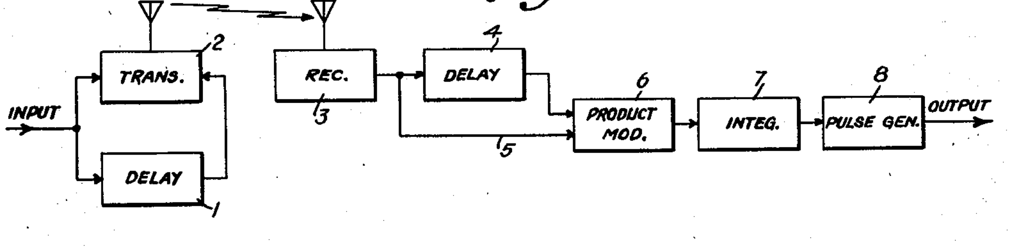
Fig. 1 shows in block schematic form an embodiment of this invention.

Referring to Fig. 1, a transmitting station is shown comprising a delay line 1 and a transmitter 2. A pulse code modulated signal is propagated both directly to transmitter 2 and through the delay line 1 to transmitter 2. The signal transmitted by transmitter 2 thus consists of a pulse and a duplicate of the pulse delayed in time in accordance with the delay characteristic of the delay line 1. The transmitting pulse train is received in receiver 3 where it is propagated both through a delay line 4 and directly over connection 5 to a product modulator 6. The product modulator 6 multiplies together the delayed pulse train and undelayed pulse train, and the resulting product is integrated by an integration circuit 7. If the output of the integration circuit 7 exceeds a predetermined voltage bias, a pulse generator 8 reproduces a pulse which corresponds substantially to the input pulse at the transmitter.

Since the components of the transmitter and receiver are all well-known devices, detailed circuitry need not be shown. For an example of pulse code communication systems which may be used in conjunction with this invention, reference may be had to U.S. Patents No. 2,272,070, dated February 3, 1942, issued to A. H. Reeves and No. 2,521,733, dated September 12, 1950, issued to A. Lesti. The invention, of course, is not limited to the use of the particular pulse code communication systems disclosed in the above references but may be used with any communication system wherein the encoded message consists of a plurality of pulses.

Figure 2:
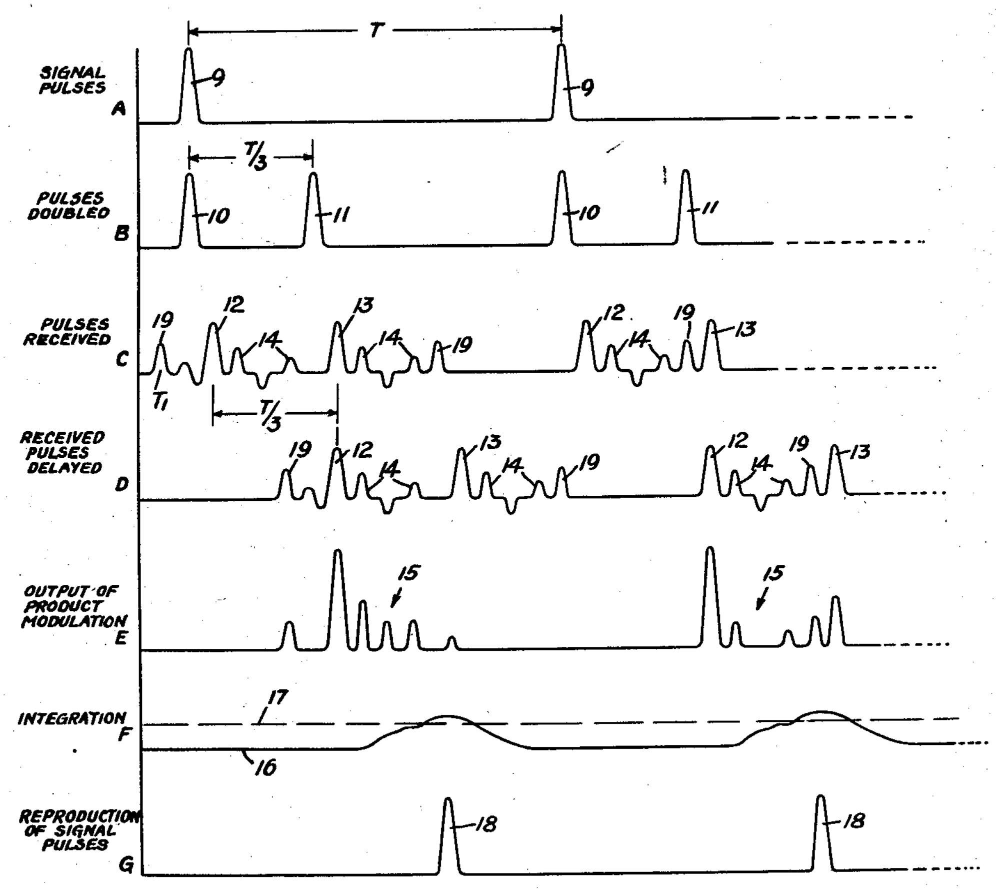
Fig. 2 illustrates a set of curves helpful in the explanation of this invention.

Referring to Fig. 2, the waveforms at various points in this communication system are shown. The input signal to the communication system, shown in curve A, comprises a signal modulated pulse 9 having a substantially constant repetition rate T. As shown in curve B, the input to the transmitter 2 comprises an undelayed pulse 10 and a delayed pulse 11 which comprises the input pulse 9 delayed by means of delay line 1. The dual pulses 10 and 11 of curve B are spaced by substantially one third of the original pulse repetition interval T. The pulse train of curve B is transmitted via the ionisphere to the receiver 3. The received detected signal, which is of a wave shape illustrated in curve C, consists of a multiple pulse train comprising pulses 12 and 13 and the noise introduced by the transmission medium. In addition, the received signal has a plurality of echo pulses 14 due to the multipath transmission via the ionisphere.

By means of the delay line 4, the received signal pulse train is delayed by an invarient time substantially equal to the time delay T/3 of the duplicate transmitted pulse, as shown in curve D. Since the ionisphere does not change appreciably during this interval, it is possible to use an invariant time delay. The product of an undelayed received pulse train, curve C, and the received pulse train delayed by delay line 4, curve D, is obtained by means of a product modulator 6. The output voltage 15 of product modulator 6, curve E, is integrated over an interval of time substantially equal to the original signal modulated pulse interval T, as shown in curve F. When the voltage output 16 of the integration circuit 7 exceeds a suitable bias amplitude 17 which can be a function of the average noise level, a pulse generator 8 is triggered creating a pulse 18, curve G. This pulse 18 is the recovered coded message at the receiver and substantially reproduces the original input signal modulated pulse 9. In effect the above process has taken the correllation between the incoming signal and the same signal displaced in time by an amount which is known, apriori, at the receiver to be the time invariant repetition interval.

To show how this system can mitigate noise of the impulsive type, assume the noise pulse 19 appears at the receiver only in the first interval time $T_1$ but not at exactly the corresponding time $$\left(T_1+\frac{T}{3}\right)$$

of the next interval, as shown in curve C. When the product of the received pulse train, curve C, and the delayed received pulse train, curve D, is taken as shown in curve E, the pulse noise is substantially eliminated due to the fact that it is of the random type and is not repeated at the same time interval so that when the delayed received pulse train is multiplied by the undelayed received pulse train, the noise pulse voltage at $T_1$ is multiplied by approximately a zero voltage of the undelayed pulse train.

Figure 3:
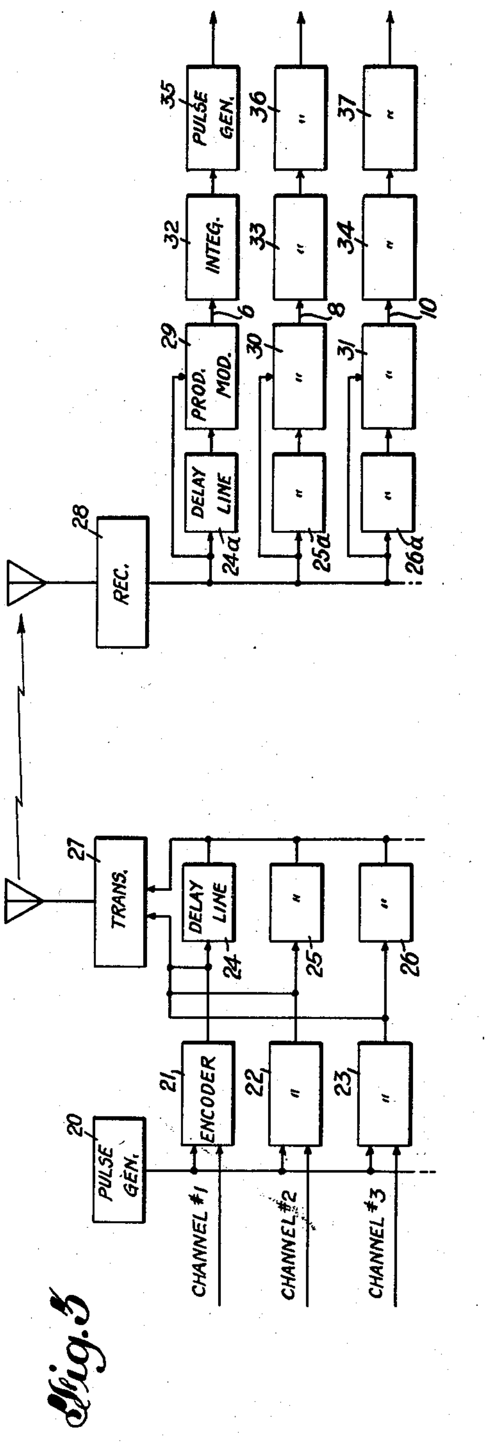
Fig. 3 illustrates in block schematic form an embodiment of this invention for the multiplexing of pulse coded messages.

Referring to Fig. 3, a transmitting station for the multiplexing of pulse coded messages, in accordance with the principles of this invention, is shown comprising a pulse generator 20, encoders 21, 22, and 23 one for each message channel 1, 2, and 3, respectively, delay lines 24, 25, and 26, one for each message channel, and a transmitter 27. It should be noted, however, that three message channels are given only as an illustration, it being clear that a greater or lesser number of channels may be multiplexed in accordance with the principles of this invention. The message signals for channels 1, 2, and 3 are combined with pulses from the pulse generator 20 in encoders 21, 22, and 23 to produce a pulse code modulated signal for each channel. These pulse coded messages are applied to transmitter 27 through delay lines 24, 25, and 26, each having a different time delay, to interleave the code signals. The signals transmitted thus consist of pulses whose amplitudes are equal to the addition of the individual message pulses and a duplicate of each message pulse delayed in time in accordance with the time delay characteristic of each of the message channel delay lines 24, 25, and 26. The transmitted pulse train received in receiver 28 is then propagated through delay lines 24*a*, 25*a*, and 26*a*, each having delay characteristics identical to the delay characteristics of the delay lines 24, 25, and 26, respectively, and the received pulse train is also propagated directly to product modulators 29, 30, and 31. The product modulators 29, 30, and 31 multiply the pulse train delayed in time in accordance with the time delay characteristic of each message channel and the undelayed received pulse train, and the resulting products are then integrated by integration circuits 32, 33, and 34. If the output of the integration circuits exceeds a predetermined volatge bias, pulse generators 35, 36, and 37 reproduce a signal in the channel output which corresponds substantially to the input signal at the transmitter to the message channel.

Figure 4:
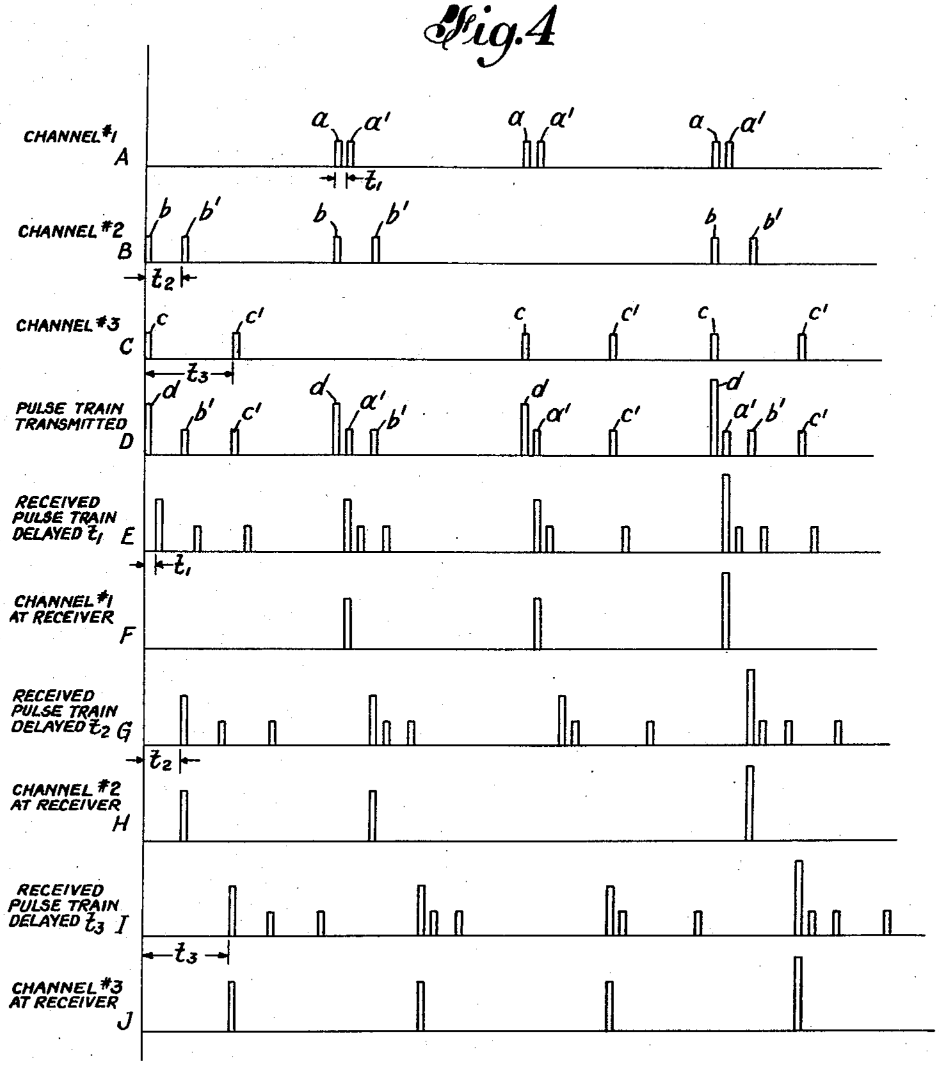
Fig. 4 illustrates a set of curves helpful in the explanation of the multiplexing of pulse coded messages.

Referring to Fig. 4, the waveforms at various points in the system for the multiplexing of pulse coded messages are shown. Curves A, B, and C illustrate the pulse coded messages *a*, *b*, and *c* of channels 1, 2, and 3, respectively, along with the delayed messages pulses *a'*, *b'*, and *c'* of each channel. Thus the input to the transmitter 27, as shown in curve D, comprises a pulse *d* which is the sum of the undelayed message pulses from each channel and the delayed pulses of each channel, delayed in time in accordance with the delay characteristics of the particular message channel of the pulse. The signal received at receiver 28 consists of the transmitted signal as illustrated in curve D plus noises introduced by the transmission medium which for purposes of simplifying the explanation of this embodiment will be disregarded since the noise is eliminated in accordance with the principles of this invention set forth heretofore. The received signal as shown in curve D is propagated directly to product modulators 29, 30, and 31. To recover the message of channel 1 the received pulse train of curve D is propagated through delay line 24*a* which has the identical time delay characteristics of delay line 24. The output of delay line 24*a* is illustrated in curve E. The delayed pulse train of channel 1, illustrated in curve E, is multiplied by the undelayed received pulse train of curve D in product modulator 29. The output of product modulator 29 shown in curve F is then integrated and a pulse generator is triggered in accordance with the principles heretofore set out. Thus the output of pulse generator 35 substantially reproduces the original input signal to channel 1.

The received pulse train as time delayed by delay line 25*a* of message channel 2 is shown in curve G. The output of the product modulator 30 is shown in curve H, and after integration at integration circuit 33 and the triggering of pulse generator 36, the output of channel 2 substantially reproduces the original pulse coded message input to channel 2. Curves I and J in a similar manner illustrate the recovery of the message transmitted via channel 3.

Figure 5:
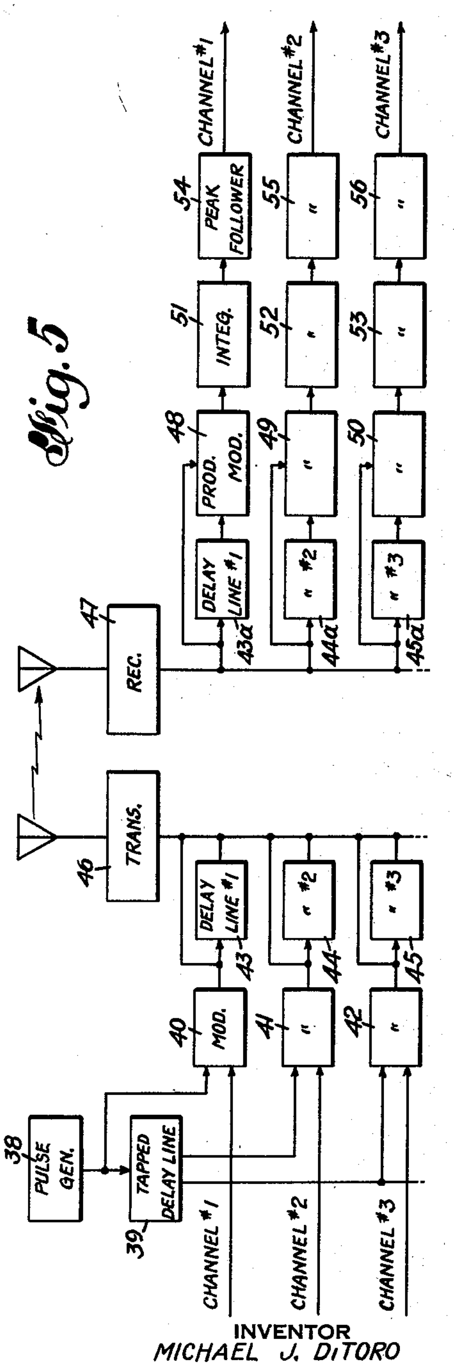
Fig. 5 illustrates in block schematic form an embodiment of this invention for the multiplexing of pulse amplitude modulated messages.

Referring to Fig. 5, a communication system in accordance with the principles of this invention for the transmission and reception of multiplexed pulse amplitude modulated messages is shown. The system comprises a pulse generator 38, a tapped delay line 39, modulators 40, 41, and 42 and delay lines 43, 44, and 45 for channels 1, 2, and 3, respectively, and a transmitter 46. Each delay line has a different time delay characteristic from the other. The pulses from pulse generator 38 are propagated directly to modulator 40 of channel 1 and through a tapped delay line 39 to modulators 41 and 42 of message channels 2 and 3, respectively, so that the pulse sampling modulation of the three channel signal inputs are interleaved in time.

The pulses from pulse generator 38 are translated into signal pulses, the amplitude of which vary according to the instantaneous values of the signal input in modulators 40, 41, and 42. The outputs of the modulators are applied directly to the transmitter 46 and through delay lines 43, 44, and 45, each having a different time delay characteristic. The transmitted pulse train is received by receiver 47 and applied directly to the product modulators 48, 49, and 50 of channels 1, 2, and 3, respectively, and through delay lines 43*a*, 44*a*, and 45*a* to the product modulators 48, 49, and 50. Delay lines 43*a*, 44*a*, and 45*a* have the identical time delay characteristics as delay lines 43, 44, and 45, respectively. The delayed and undelayed pulse trains are mulitplied by product modulators 48, 49, and 50 and the output of each is fed to the associated integration circuits 51, 52, and 53, respectively. When the voltage output of the integration circuit exceeds a suitable bias level, it is fed to the peak follower circuits 54, 55, and 56, as the case may be. The output from the peak follower circuits substantially reproduces the original input signal of channels 1, 2, and 3, respectively.

Figure 6:
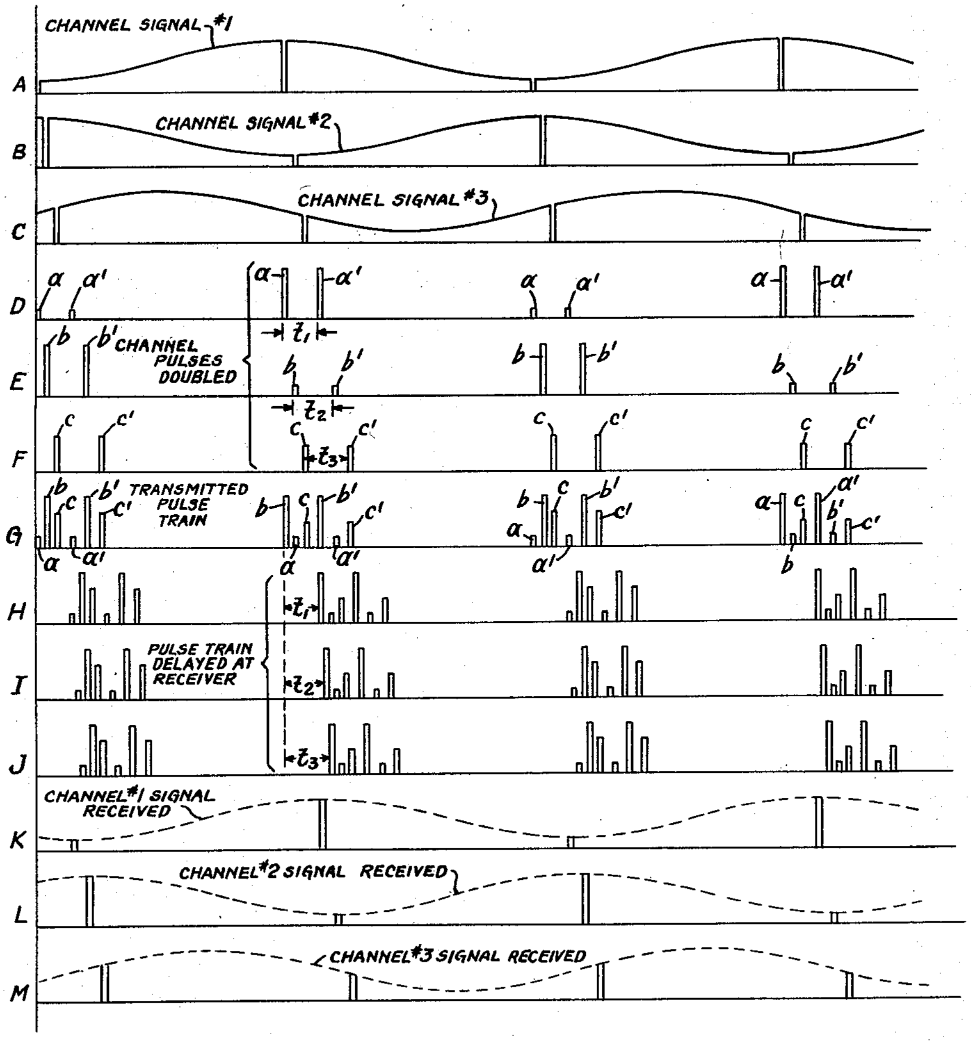
Fig. 6 illustrates a set of curves helpful in the explanation of the multiplexing of pulse amplitude modulated messages.

Referring to Fig. 6, the waveforms at various points in the system for the multiplexing of pulse amplitude modulated messages is shown. The sine wave shapes of curves A, B, and C represent the signal input to channels 1, 2, and 3, respectively. The pulses from the pulse generator 38 are fed directly to modulator 40 controlling the instantaneous voltage sampling of the input signal of channel 1 as shown by curve A. The pulses from pulse generator 38 propagated through tapped time delay line 39 to modulators 41 and 42 controlling the instantaneous voltage sampling of channels 2 and 3 as shown in curves B and C. The input to transmitter 46 from the sampled signal channels 1, 2, and 3 are shown in curves D, E, and F, respectively. The inputs to the transmitter 46 due to each signal channel consist of the undelayed modulated pulses *a*, *b*, and *c* and modulated pulses *a'*, *b'*, and *c'* delayed in time in accordance with the time delay characteristics of delay lines 43, 44, and 45. The transmitted pulse train comprises the pulses due to the signal from each channel as shown in curve G. The signal received at receiver 47 consists of the transmitted signal pulse train as illustrated in curve G plus noise introduced by the transmission medium, which, for purposes of simplifying the explanation, will be disregarded since the noise is eliminated in accordance with the principles set forth heretofore. The received pulse train as illustrated in curve G is delayed by delay lines **43*a*, 44*a*, and 45*a* in accordance with the delay time characteristics of each channel 1, 2, and 3, respectively, as illustrated in curves H, I, and J. Product modulator 48 multiplies the undelayed received pulse train of curve G and the pulse train delayed by delay line 43*a* in accordance with the time delay characteristics of channel 1. The output of product modulator 48, as illustrated by the pulses of curve K, is then integrated by integration circuit 51. When the voltage output of the integration circuit 51 exceeds a predetermined voltage level, it is fed to the peak follower 54. The output of peak follower 54 substantially reproduces the original signal input to channel 1 as illustrated by the sine wave of curve K. In a similar manner the output of product modulator 49 of channel 2, wherein signals according to curves G and I are multiplied, and the output of product modulator 50 of channel 3, wherein signals according to curves G and J are multiplied, are propagated through integration circuits 52 and 53 and peak followers 55 and 56, respectively, to substantially reproduce the original signal inputs to channel 2 and channel 3** as illustrated in curves L and M.

While I have described above the principles of my invention in connection with certain embodiments, it is to be clearly understood that this description is made by way of example only and not as a limitation to the scope of my invention as set forth in the objects thereof and in the accompanying claims.

I claim:

1. A communication system for the transmission of signal modulated pulses comprising a transmitter including a source of signal modulated pulses, means to duplicate each of said signal pulses, and means to transmit as a pulse train said signal pulses and duplicated signal pulses at a predetermined fixed time interval therebetween, and a receiver for receiving the transmitted signal pulses, means to delay the received signal pulses for a period equal to said predetermined time interval, means to multiply together the delayed received pulses and undelayed received pulses, means to integrate the resulting product of the pulse multiplying operation, and means to generate pulses responsive to said integration.

2. A long range communication system for the transmission of signal modulated pulses via the ionisphere comprising a transmitter including a source of signal modulated pulses, means to duplicate each of said signal pulses at a predetermined fixed interval equal to at least the maximum dispersion time of the ionisphere, and means to transmit as a signal pulse train said signal pulses and said duplicated signal pulses, means to receive said transmitted signal pulses, means to delay said received signal pulses for a period equal to said interval, means to multiply together said delayed received signal pulses and undelayed received signal pulses, means to integrate the resulting product of the pulse multiplying operation, and means responsive to said integration to generate a pulse whereby the original signal pulse is substantially reproduced.

3. A system according to claim 2, wherein said means to duplicate said signal pulses comprises means to couple said source of signal modulated pulses to said transmitter, and means to delay said signal pulses coupled in parallel relation with first mentioned coupling means.

4. A system according to claim 2, wherein said means to multiply said delayed received signal pulses and undelayed received signal pulses comprises a product modulator.

5. In a receiver for signals comprising signal modulated pulses and delayed duplicates of said signal modulated pulses, means to delay the received signal pulses, means to multiply said delayed received signal pulses and undelayed received signal pulses, means to integrate the resulting product of the pulse multiplying operation, and means responsive to said integration to generate a pulse whereby the original signal pulse is substantially reproduced.

6. A receiver according to claim 5, wherein said means to multiply said delayed received signal pulses and undelayed received signal pulses comprises a product modulator.

7. A method for transmitting and receiving signal modulated pulses comprising transmitting signal modulated pulses and transmitting at a predetermined fixed time interval after each pulse transmission a duplicate of each signal modulated pulse, receiving the transmitted signal pulses, delaying said received signal pulses for said fixed interval, multiplying together said delayed and undelayed received signal pulses, integrating the product of the pulse multiplying operation, and generating a pulse when the result of said integration exceeds a predetermined voltage bias whereby the original signal pulses are substantially reproduced.

8. A multichannel transmission system comprising a transmitter including a plurality of pulse coded signal energy sources, means to duplicate each of said signal pulses at a fixed delayed time interval different for each pulse coded signal source, means to produce a train of pulses corresponding to said plurality of signal pulses and said duplicate signal pulses taken together, and means to transmit said train of pulses, a receiver for receiving the transmitted train of pulses, a plurality of delay units each corresponding in delay characteristics to the delay imposed upon the signals of one of said signal sources, means to multiply the delayed received train of pulses from each of said units with the undelayed received train of pulses, means to integrate the resulting product of each multiplying operation, and means to reproduce signal intelligence from the output of the integrating means.

9. A multichannel transmission system comprising a transmitter including a plurality of signal energy sources, means to produce a plurality of series of pulses differently timed so that the pulses of different series interleave in time, means to translate the pulses of each series into signal pulses the amplitude of which varies according to the instantaneous values of the signal energy of a corresponding signal source means to duplicate each of said translated pulses of each series at a different fixed predetermined time interval for each series of pulses, means to produce a train of pulses corresponding to said plurality of signal pulses and duplicate signal pulses taken together, and means to transmit said train of pulses, and a receiver for receiving said transmitted train of pulses, a plurality of means to delay the received train of pulses the said different predetermined time intervals one for each of said series of pulses, means for each of said delay means to multiply the delayed pulse output thereof with the undelayed received train of pulses, means to integrate each of the resulting products of the pulse multiplying means, and means to substantially reproduce each of the original signal energy inputs from the output of the integration means.

10. A multichannel transmitter comprising a plurality of pulse coded signal energy sources, means to duplicate each of said signal pulses delayed a fixed time interval different for each pulse coded signal source, means to produce a train of pulses corresponding to said plurality of signal pulses and said duplicate signal pulses taken together, and means to transmit said train of pulses.

11. A multichannel transmitter comprising a plurality of signal energy sources, means to produce a plurality of series of pulses differently timed so that the pulses of different series interleave in time, means to translate the pulses of each series into signal pulses the amplitude of which varies according to the instantaneous values of the signal energy of a corresponding signal source, means to duplicate each of said translated pulses of each series at a different fixed predetermined time interval for each series of pulses, means to produce a train of pulses corresponding to said plurality of signal pulses and duplicate signal pulses taken together, and means to transmit said train of pulses.

12. A receiver for multiplexed pulse signals wherein the transmitted train of signal pulses includes a duplication of the signal pulses delayed a different fixed amount for different channels, comprising means to receive said train of signal pulses, a plurality of delay units each corresponding in delay characteristics to the delay imposed upon the pulses of a corresponding signal channel, means to multiply the delayed output of each of said delay units with undelayed received pulses, means to integrate the resulting product per channel, and means to reproduce the signal pulses of the channel from the output of said intergrating means.

13. Means for separating a repetitive type signal from a non-repetitive type signal comprising, an input terminal, a time delay device with its input connected to the input terminal, a multiplier connected to the output of the time delay device and to the input terminal, an integrator connected to the output of the multiplier, and means connected to the integrator to generate pulses.

References Cited in the file of this patent

UNITED STATES PATENTS

| | | |
|---|---|---|
| 2,175,270 | Koch | Oct. 10, 1939 |
| 2,227,057 | Blumlein | Dec. 31, 1940 |
| 2,266,401 | Reeves | Dec. 16, 1941 |
| 2,310,692 | Hansell | Feb. 9, 1943 |
| 2,426,187 | Earp | Aug. 26, 1947 |
| 2,462,110 | Levy | Feb. 22, 1949 |
| 2,478,919 | Hansell | Aug. 16, 1949 |
| 2,495,690 | Bradley | Jan. 31, 1950 |
| 2,531,412 | Deloraine | Nov. 28, 1950 |
| 2,541,986 | Cleeton | Feb. 20, 1951 |
| 2,568,265 | Alvarez | Sept. 18, 1951 |